United States Patent [19]
Wylie

[11] Patent Number: 5,944,202
[45] Date of Patent: Aug. 31, 1999

[54] MATERIAL HANDLING PUSHBACK

[76] Inventor: John F. Wylie, 1606 Colton Dr., Orlando, Fla. 32822

[21] Appl. No.: 08/972,660

[22] Filed: Nov. 18, 1997

[51] Int. Cl.[6] .................................................. A47F 5/00
[52] U.S. Cl. ...................... 211/151; 211/1.57; 414/276; 414/286
[58] Field of Search ................... 211/151, 1.51, 211/1.57, 1.56, 122; 414/276, 286

[56] References Cited

U.S. PATENT DOCUMENTS

| | | |
|---|---|---|
| 166,976 | 8/1875 | Eppelsheimer . |
| 1,448,119 | 3/1923 | Hutton . |
| 1,463,137 | 7/1923 | Makepeace . |
| 1,795,846 | 3/1931 | Drake . |
| 2,019,949 | 11/1935 | Brace . |
| 2,575,055 | 11/1951 | Jaeger . |
| 2,988,012 | 6/1961 | Markley et al. . |
| 3,465,894 | 9/1969 | Setecka . |
| 3,465,897 | 9/1969 | Schumann et al. . |
| 3,782,293 | 1/1974 | Donohue et al. . |
| 4,003,315 | 1/1977 | Barth . |
| 4,227,466 | 10/1980 | Rooklyn . |
| 4,341,313 | 7/1982 | Döring . |
| 4,359,946 | 11/1982 | Marvin . |
| 4,462,500 | 7/1984 | Konstant et al. . |
| 4,662,511 | 5/1987 | Greener . |
| 4,687,404 | 8/1987 | Seiz et al. . |
| 4,773,546 | 9/1988 | Konstant . |
| 4,915,240 | 4/1990 | Konstant . |
| 5,080,241 | 1/1992 | Konstant . |
| 5,117,990 | 6/1992 | Krummell et al. . |
| 5,141,118 | 8/1992 | Gay . |
| 5,180,069 | 1/1993 | Krummell et al. . |
| 5,203,464 | 4/1993 | Allen ........................................ 211/151 |
| 5,538,384 | 7/1996 | Haldimann ............................... 414/286 |
| 5,638,965 | 6/1997 | Mattingly et al. ........................ 211/151 |

FOREIGN PATENT DOCUMENTS

| | | |
|---|---|---|
| 959 922 | 3/1957 | Germany . |
| 1-226470 | 11/1989 | Japan . |
| 3-264414 | 11/1991 | Japan . |
| WO 86/04569 | 8/1986 | WIPO . |

*Primary Examiner*—Robert W Gibson, Jr.
*Attorney, Agent, or Firm*—Harness, Dickey & Pierce, P.L.C.

[57] ABSTRACT

A warehouse storage pushback device is provided having a first and second drive. Each drive has a chain, with a plurality of pads attached thereto, forming a closed loop. A plurality of rotating discs meshes with the chain and are rotatably mounted to an external structure. A plurality of rollers are rotatably attached to the chain and each pad and are in rolling engagement with a track. The first drive is able to operate independently of the second drive, allowing pads on one side of the material to be adjusted for better support while the others remain stationary. The device is used for storing pallets and provides other material handling functions.

18 Claims, 8 Drawing Sheets

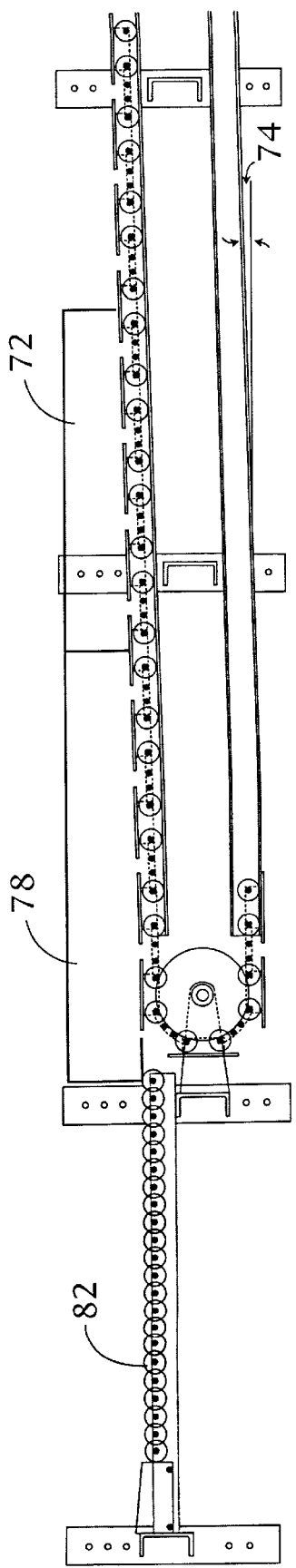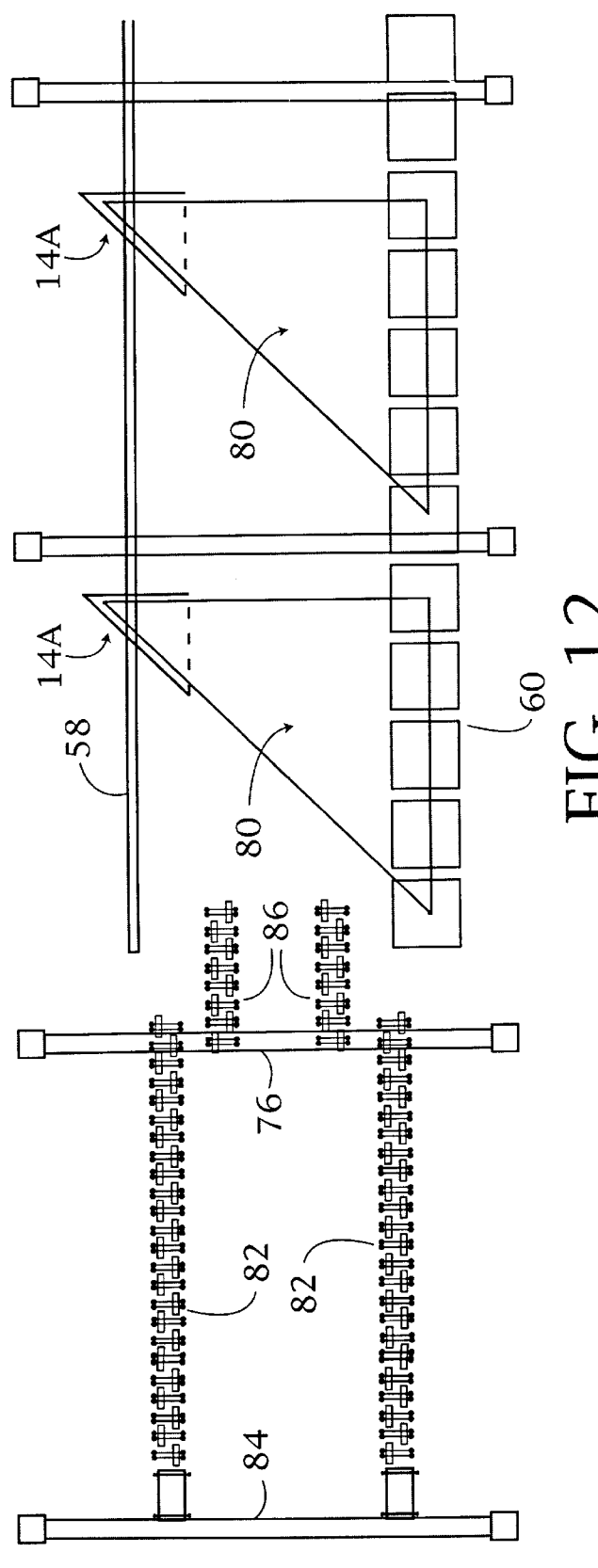
FIG. 11
FIG. 12

5,944,202

MATERIAL HANDLING PUSHBACK

FIELD OF THE INVENTION

The present invention relates generally to a material handling pushback and more particularly to a material handling pushback which allows adjustment of the material carrying surface to better suit movement of various shapes, provides for independent adjustment of individual tracks and allows each track to follow a nonlinear path.

BACKGROUND OF THE INVENTION

Efficient material handling is essential to competitive manufacturing. In warehouse storage facilities, reducing the amount of square footage required to store material and increasing accessibility to stored material reduces overhead cost and increases manufacturing thruput. The result is increased profit for the manufacturer.

Previous inventions, such as U.S. Pat. Nos. 4,341,313, Doring; 5,141,118, Gay; 4,687,404, Seiz; and 5,180,069, Krummell, disclose inventions which attempt to utilize warehouse storage more efficiently. These inventions generally disclose warehouse storage systems comprising a plurality of bays. Each bay contains a series of nested carts which roll along a series of rails. When no material is being stored, the carts reside on top of one another at a position close to a user. Material is placed on a first cart and then the cart is "pushed back" along two rails to a rearward position exposing the next cart. The rails are inclined toward the user to allow the carts to roll to a position toward the front of the bay, closest to the user. This allows easy access to stored material when retrieval is desired.

However, the use of the above warehouse storage facilities creates some difficulties. First, because the carts disclosed in these inventions are bulky and have a fixed geometry, they cannot easily be removed from the storage facility and replaced.

Second, since the carts bridge across both rails, the cart's position along each rail cannot be adjusted independent of the other rail. This lack of independent adjustment can limit the types of unique material configurations for which the cart can store. Also, a forklift placing material on a pushback which is not oriented parallel to the drives causes more force to be applied to one drive than another. If the drives are independent of one another, one drive can give more due to the increased force than the other.

Third, because of the stacked configuration, the length of the prior art pushbacks are limited. The length of the prior art pushbacks are based on the amount of pushbacks which can be stacked on top of one another. The more available height, the more rectangular sections can be stacked which means the more available length of the pushback.

Lastly, because of the cart's rigidity and type of engagement to the rails, the carts are able only to follow linear rails. They are not able to bend or move along a curved surface when being pushed back. This restriction can limit areas where the warehouse storage unit is located and surfaces on which it is placed. The present invention was designed in light of these drawbacks.

SUMMARY OF THE INVENTION

According to the present invention, the foregoing and other objects and advantages are attained by a pushback material storage device, comprising a first and second drive which are able to operate independently of each other. Each drive has a plurality of pads connected to each other in such a way as to maintain a constant spacial relationship between the pads along a path. The connecting means and the pads are in rolling engagement with a track such that the pads are able to move along the path. The spacial relationship between pads may be changed by adding or removing pads in certain areas to accommodate varying material geometries. This can allow a user to adjust pad location to position the pads at particular points under the material. Furthermore, the spacial relationship of the pads on the first drive need not be the same as the spacial relationship between pads of the second drive. Likewise, the configuration of the pad surface on the first drive may be different than the configuration of the pad surface on the second drive. Thus, the pad surfaces can be custom designed to support a specific type of cargo. Lastly, the connecting means may be designed of a flexible material such that the track need not be limited to a linear configuration and can follow a curved surface.

In accordance with another aspect of the invention, a pushback material storage device is provided having a first and second drive. Each drive has a chain, with a plurality of pads attached thereto. A plurality of rotating discs are slidingly engaged with the chain and are rotatably mounted to an external structure. A plurality of rollers are rotatably attached to the chain and each pad and are in rolling engagement with a track. The first drive is able to operate independently of the second drive, allowing pads on one side of the material to be adjusted for better support while the others remain stationary. In a preferred embodiment of the present invention, each drive further comprises a second chain, with pads attached thereto and a second plurality of rotating discs slidingly engages the chain. A second plurality of rollers, rotatably attached to the second chain and each pad, are in rolling engagement with the track. The track can be designed with a T shaped cross section to reduce lateral, up and down movement of the rollers and the pads. The track can also have an angle of inclination such that a load placed on each pad causes the pad to travel in a first direction, preferably toward a location accessible to a user. Again, the spacial relationship, between pads, may be adjusted. The adjustment of the first drive may be independent of the second drive. The pad supporting surfaces can be shaped to support a specific type of material, and the pad supporting surface shape of the first drive may be different than the pad supporting surface shape of the second drive.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 11 shows a side view of a pushback with cargo loaded and pushed back according to the present invention, and FIG. 12 shows a top view of a pushback supporting a unique load according to the present invention.

DETAILED DESCRIPTION OF THE DRAWINGS

Figure 1:
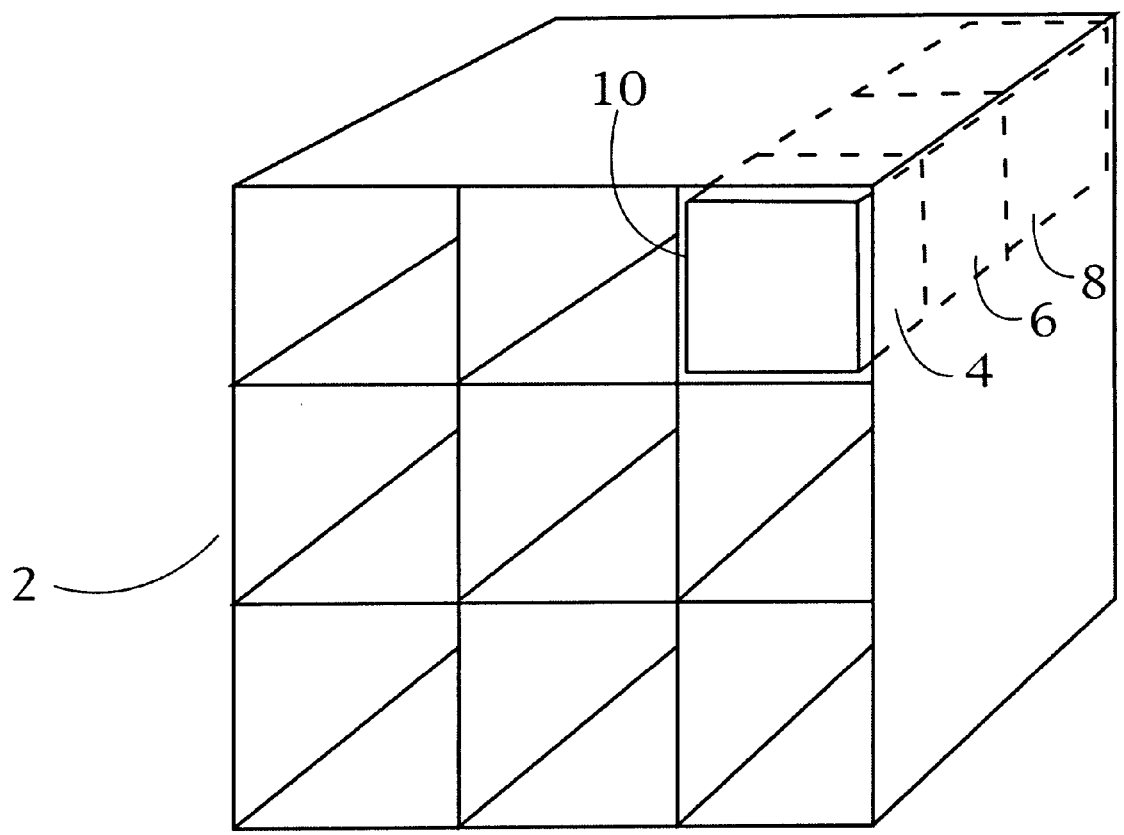
FIG. 1 shows a perspective view of a series of pushbacks.

Referring to FIG. 1, the general application of a pushback is illustrated. Here, a set of 9 pushbacks are shown honeycombed in a pushback unit generally designated as 2. Material 4, 6 and 8 are shown as placed in pushback 10. When material 4 is removed from the front of pushback 10, the pushback mechanism operates to move material 6 and 8 to the front of pushback 10. By this method, material 6 becomes accessible and able to be removed. The result is a storage facility which can store more material closer together without the need for many access aisles to get at the material.

Figure 2:
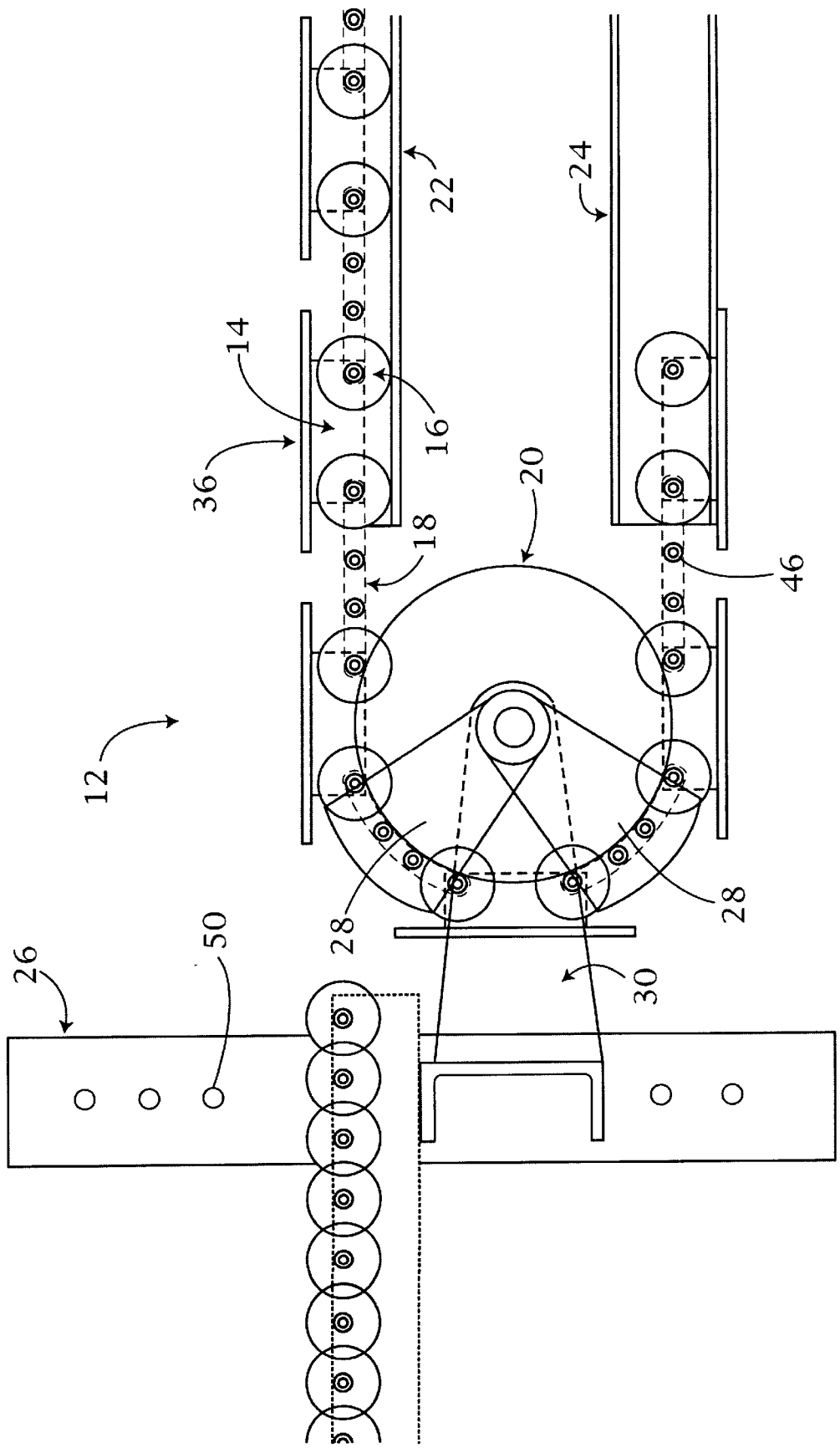
FIG. 2 shows a side view of a pushback drive according to the present invention.
Figure 3:
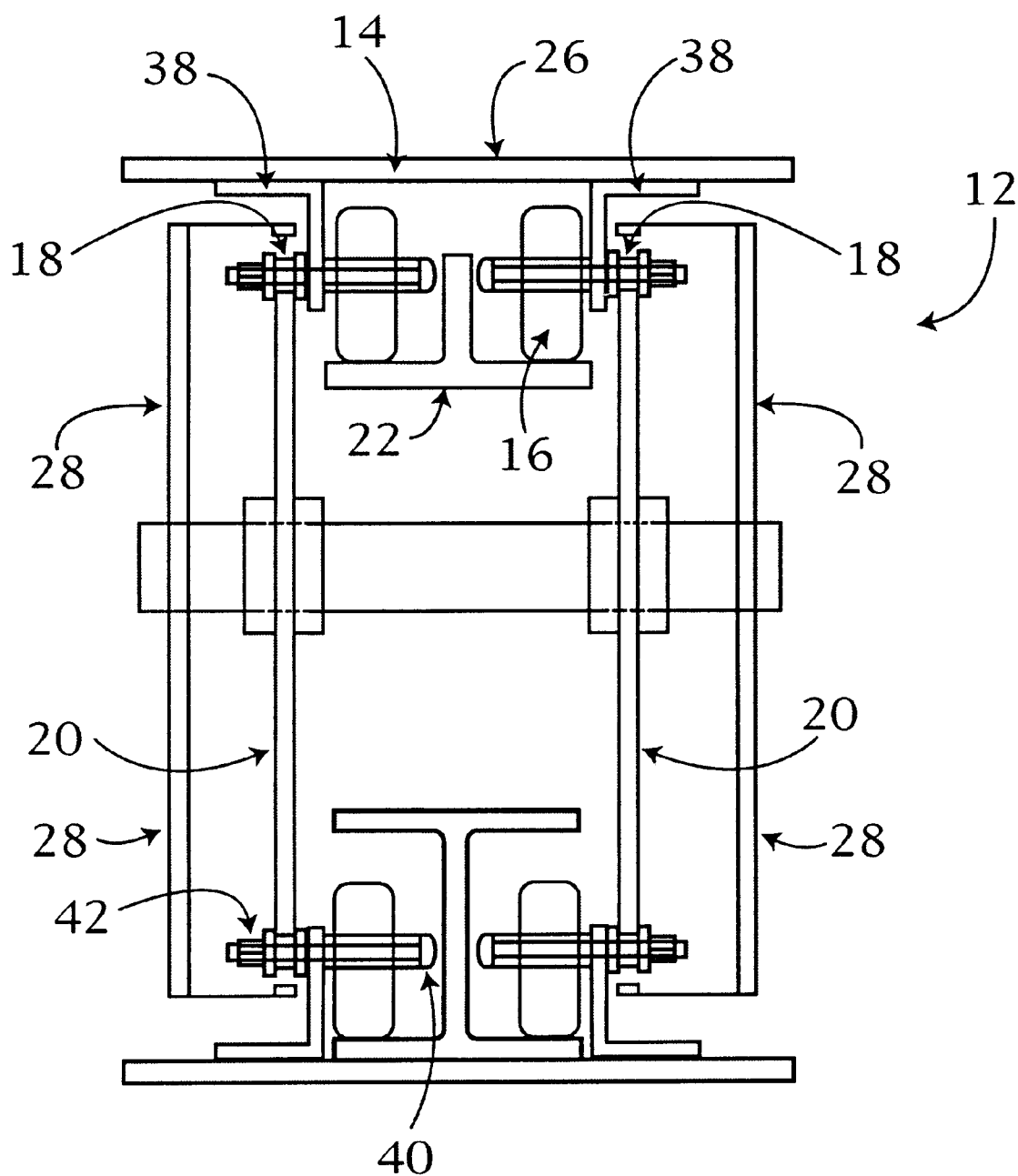
FIG. 3 shows a front view of a pushback drive according to the present invention.

The present invention will now be described. The present invention generally comprises two drives aligned next to each other (as will be discussed). Referring to FIG. 2 and 3, there is illustrated a side and front view portion respectively of one drive of the push back generally designated as 12. The drive generally comprises pads 14, rollers 16, chains 18, rotating discs 20, an upper rail 22, a lower rail 24, a plurality of frames 26, guards 28 and supports 30.

As illustrated in FIG. 2, each of the pads 14 generally has a supporting surface 36 for supporting the material to be stored and an attachment area for attachment to a chain 18 and rollers 16. Each pad 14 can be made of metal or plastic but should be made of suitable material for supporting the weight of the material. However, the pad 14 is preferably light enough to allow a user to easily lift and remove it from a drive. The pad supporting surface 36 can be custom designed to support varying types of material.

Referring to FIG. 3, each pad 14 is attached by an attachment means to rollers 16 and chains 18. Preferably, Pad 14 is affixed by angle brackets 38 to rollers 16 and chains 18. Bolt 40 slides through roller 16, through angle bracket 38, through chain 18 and is closed by nut 42. This allows easy removal of pad 14 for repair or replacement purposes. By this way, a damaged or worn pad may be easily be replaced, or pads with custom designed supporting surfaces may be attached to chain 18 for specific types of material. The bolt 40 preferably acts as an axle and is easily removable by removing the nut 42 and sliding the bolt 40 free. The attachment means should be strong enough to support the respective pad's distributed portion of the weight imposed upon it by the material. However, depending on the material weight, strength of the chain and number of pads, it may not be necessary to have rollers attached to every pad. For instance, a roller may be placed on every third pad. In that situation, the remaining two pads would be supported by the chain.

It should be noted that the rollers 16 can be attached to chains 18 and pads 14 in such a way as to allow free rolling movement of the roller and is not limited to that method disclosed herein. For instance, the rolling action may be accomplished by positioning an axle, bearing or other suitable rolling element between the connecting means and the rollers 16 to ensure that they are able to freely turn.

Referring back to FIG. 2, the rollers are positioned such that they roll along upper rail 22 and lower rail 24. The chain can be any typical connector used in a drive system. It is noted that the chain may also be a belt, wire or any other suitable material for attaching the pads together. If a chain is used, the link size can be varied. By varying the link size, the distance between each respective roller of each pad can be varied. This variation may be conducive to adjusting the pad spacing for different types of loading. Also, the number of links between each respective roller can be changed. Thus, the number of points of rotation 46 between each respective pad can be varied. This allows the pads to have the flexibility to follow a bumpy terrain by use of an increased number of points of rotation 46 or allow for increased rigidity of the chain by reducing the number of points of rotation 46. Since a chain or similar flexible structure is used, the upper rail 22 can follow a nonlinear and curved path, and therefore, pads 14 can follow a curved path. This allows the push back system to be located on bumpy, curved or secluded surfaces where straight storage paths are impractical or impossible.

Rotating disc 20 is supported by support 30 which is attached to frame 26. Rotating disc 20 should be rotatably attached to support 30 to allow free rotational movement relative to support 30. This attachment can be by axle, bearing or other suitable method allowing free rotation and proper support of the required distributed portion of the material weight. The rotating disc diameter should be sufficient to ensure that rollers 16 are in contact with upper rail 22 and lower rail 24. However, rotating disc 20 can be non-rotatably attached and therefore pads 14 can merely roll around rotating disc by rollers 16.

Figure 10:
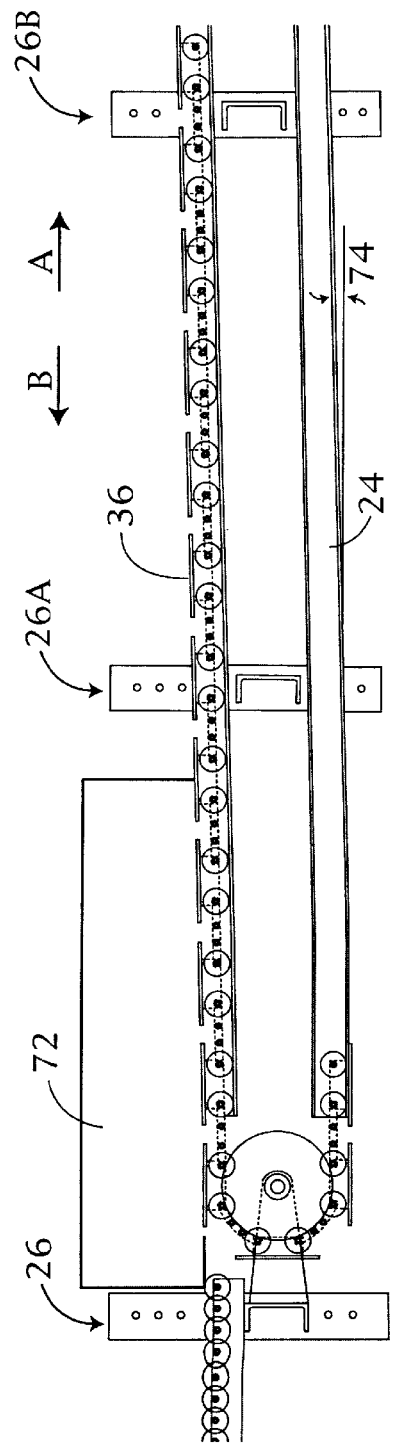
FIG. 10 shows a side view of a pushback with cargo loaded according to the present invention.

Rails 22 and 24 are substantially "T" shaped to keep rollers 16 and thus pad 14 from moving too far from side to side or up and down and thus keeping pads 14 on track. Rails 22 and 24 are supported by frame 26, 26A and 26B (as shown in FIG. 10) by bolting, welding or other suitable method for attachment.

Support 30 is attached to frame 26 by bolts bolted to bolt holes 50. Because of this form of attachment, support 30 can be attached to any frame including frame 26a or 26B as shown in FIG. 10. Furthermore, support 30 can be reversed in direction and thus protrude from frame 26 in an opposite direction as that shown in FIG. 2. This allows, once again, a different positioning of the rotating disc 20. Furthermore, support 30 can be moved up or down on frame 26 thereby increasing the level of the conveyor as a whole.

Figure 4:
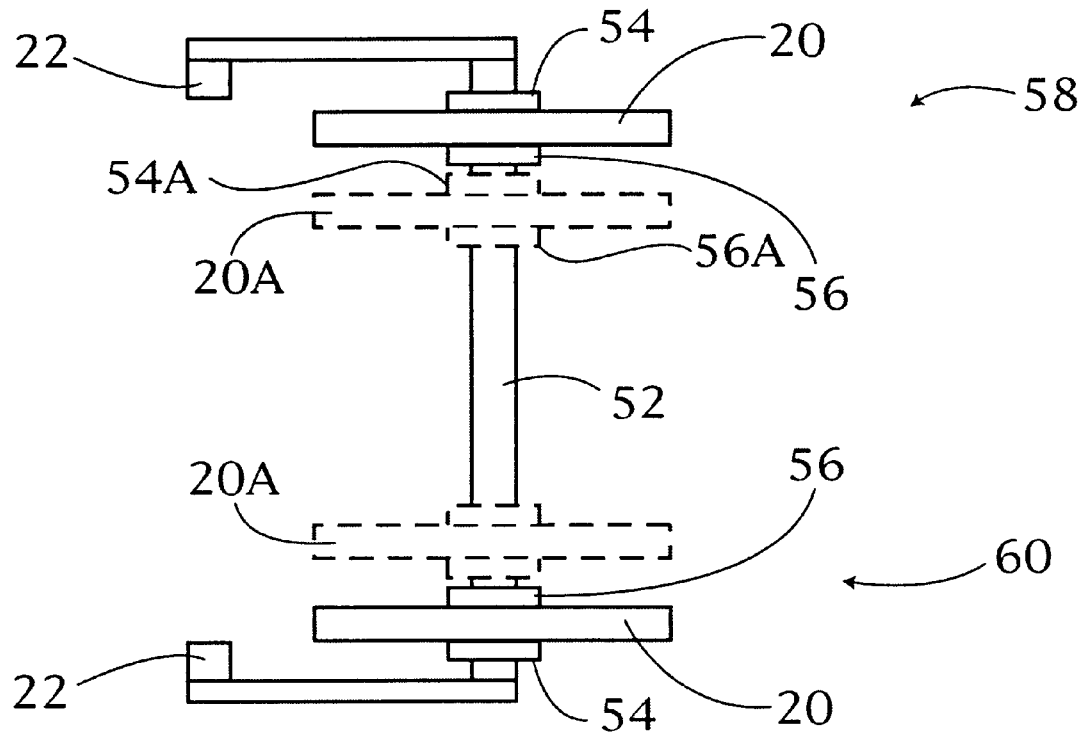
FIG. 4 shows a top cross sectional view of two rotating discs along an axle of a pushback according to the present invention.

Referring to FIG. 4, the lateral adjustability of the rotating discs 20 is illustrated. Here, rotating discs 20 are locked in place along shaft 52 by bearing blocks 54 and 56. When it is desired to bring each respective drive closer to the other, bearing blocks 54 and 56 can be loosened, rotating discs 20 can be moved to position 20A, and bearing blocks 54 and 56 can be locked down at positions 54A and 56A.

Figure 5:
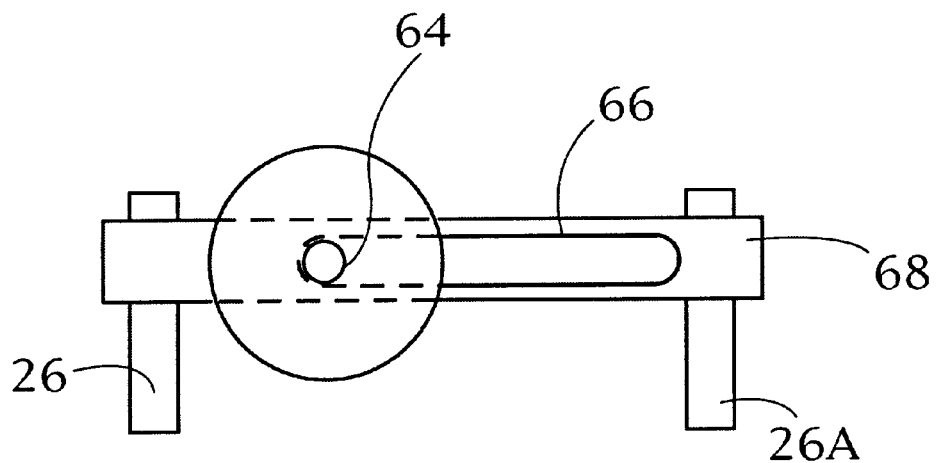
FIG. 5 shows a side cross sectional view of a pushback with an adjustable slot according to the present invention.

FIG. 5 shows another embodiment of the present invention. Here, bar 68 is supported by frames 26 and 26A. Shaft 64 is located along groove 66. Groove 66 allows infinitely variable adjustment of the position of rotating disc 20 along bar 68. Shaft 64 can be locked into place by bearing blocks or other well known devices to lock shafts in an elongated groove.

As shown in FIG. 2, guards 28 are rigidly attached to support 30. This attachment is preferably by welding. As shown in FIG. 3, guards 28 project out over chain 18 thereby keeping chain 18 traveling around the circumference of rotating disc 20 when chain 18 is traveling in a counter-clockwise direction with respect to FIG. 2. Without these guards, chain 18 might drop to the ground instead of traveling along lower rail 24 when operating in a counter-clockwise direction.

Figure 6:
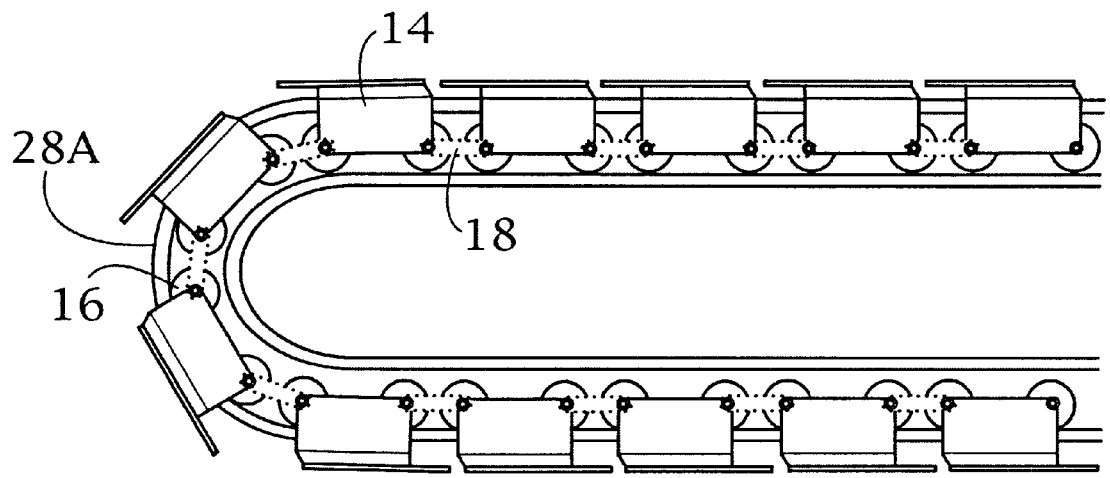
FIG. 6 shows a side cross sectional view of one drive of a pushback with a roller guide according to the present invention.
Figure 7:
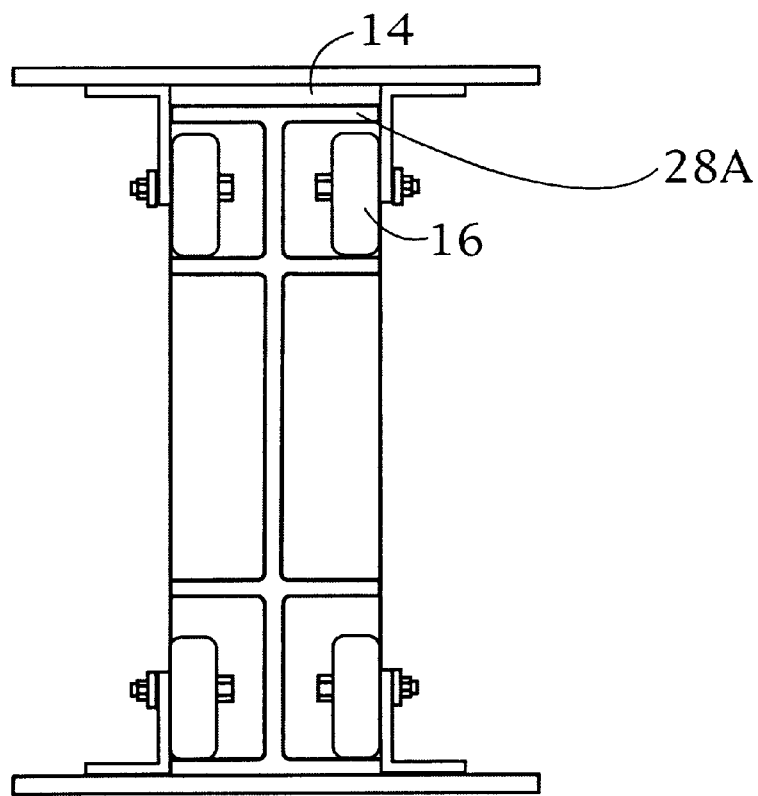
FIG. 7 shows a front cross sectional view of one drive of a pushback with a roller guide according to the present invention.

In another embodiment, as shown in FIG. 6 and 7, guards 28 are replaced with track 28A. Here, track 28A provides a guide which rollers 16 can follow. As shown in FIG. 7, track 28A is an I-beam wrapped in a semicircle. Rollers 16 ride along each side of the I beam portion and are thereby guided around the circumference of the track 28A.

Figure 8:
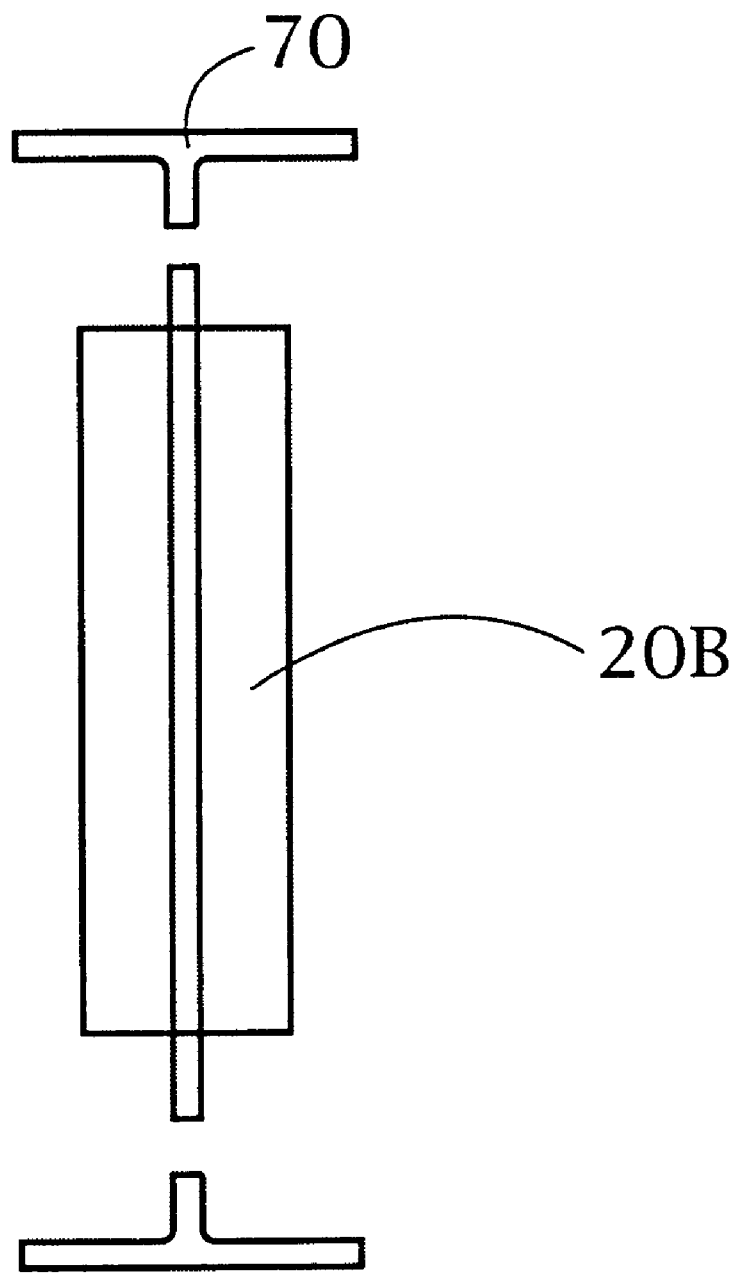
FIG. 8 shows a front cross sectional view of one drive of a pushback with a T roller according to the present invention.

In another embodiment of the present invention as shown in FIG. 8, the "I" formation of the track is created by rolling a "T" shaped bar 70 into a semicircle around a rotating disc 20B with a piece of keystock welded therearound.

In another embodiment, the guards can be eliminated by use of a cable, wire, cord or other suitable flexible connector. The connector can be attached at one end to the last pad on upper rail 22, circled around a pulley located opposite rotating disc 20, and connected to the last lower pad on lower rail 24. Thus, the connector maintains tension on pads 14 located on the upper and lower rails 22 and 24 respectively. As a result, the pads on upper rail 22 do not have a tendency to fall around rotating disc 20 and on to the ground.

Figure 9:
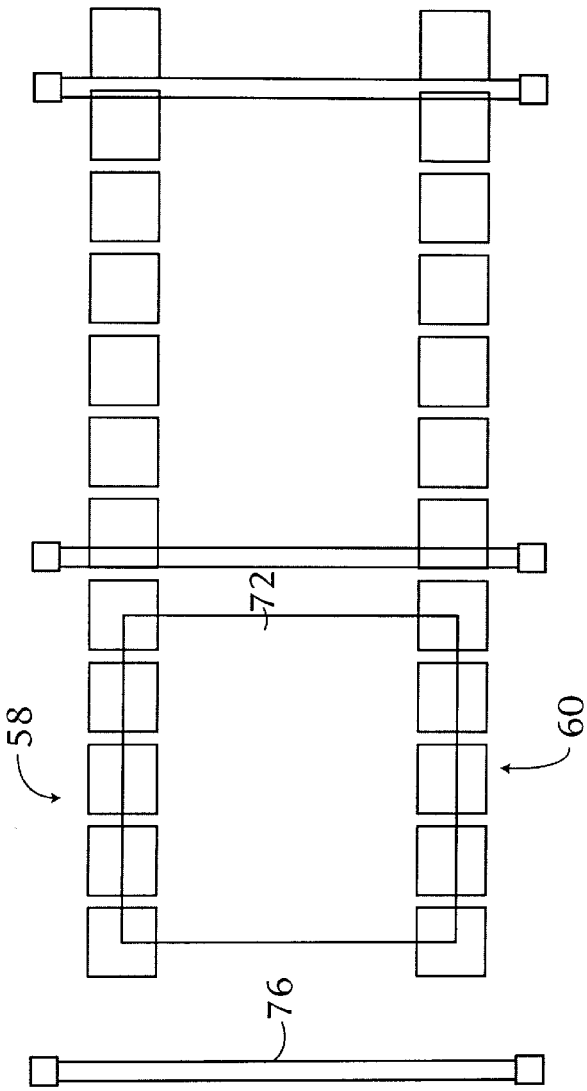
FIG. 9 shows a top view of a pushback with cargo loaded according to the present invention.

Referring to FIG. 9, 10 and 11, the general operation of the present invention is now described. In FIG. 9, the material 72 bridges drives 58 and 60. Initially, material 72 in FIG. 9 and 10 rests on pad supporting surfaces 36. The weight of material 72 is distributed through pads 14 and transferred to rollers 16. Since upper rails 22 are at an angle of inclination 74, the transferred weight causes rollers 16 to press against upper rails 22 creating a resultant force in direction B. Because rollers 16 and rotating discs 20 are freely rotatable, the resultant force causes drives 58 and 60 to rotate counter clockwise and allow material 72 to roll to a stopped position at frame 26. This stop can be piece of metal or other suitable material attached to crossbar 76 which keeps material 72 from continuing to move in direction B. The stop can be any device which only allows material 72 to move to a certain position or allows drives 58 and 60 to rotate to a certain position and is not limited by the device disclosed herein. In this embodiment, the stop is located at a position at crossbar 76.

In operation, as shown in FIG. 11, material 78 is pressed against material 72, rotating drives 58 and 60 clockwise and ultimately placing material 78 and 72 in their respective positions in FIG. 11. By rotating drives 58 and 60 clockwise, the pads located on lower rail 24 are pulled in direction B, thereby reducing the number of pads resting on lower rail 24 and increasing the number of pads on upper rail 22. Next, the weight of both material 78 and 72 causes drives 58 and 60 to rotate counter clockwise and roll material 78 against the stop at crossbar 76. By rotating the drives 58 and 60 counterclockwise, the pads 14 move in direction B along upper rail 22, around rotating disc 20 guided by guards 28, and down along lower rail 24. As a result, the number of pads on lower rail 24 increases and the number of pads on upper rail 22 decreases.

The angle of inclination 74 can be altered to provide different types of material storage. For instance, if First In First Out (FIFO) material storage is desired, the angle of inclination 74 can be altered to a negative angle relative to that illustrated in FIG. 10. As a result, inventory will flow in direction A (as shown in FIG. 10), thereby allowing the first in inventory to be available on the opposite side of the pushback for retrieval. Alternatively, angle of inclination 74 can be oriented as shown in FIG. 10 for a First In Last Out (FILO) material storage system. As a result, the last in material is available for retrieval at frame 26C. If angle of inclination 74 is level, either a FIFO or a FILO system may be employed.

In FIG. 12, the advantage of easy removableness of pads 14 is illustrated. Here, pads 14 on either drive may be removed and alternate pads may be attached. FIG. 12 shows pads 14 removed on drive 58 and pads 14A being attached thereto. To better support unique material 80 having a unique shape. Since drive 58 may be rotated independently of drive 60, drive 58 may be rotated to position pads 14A in a strategic location under unique material 80.

In FIG. 12, roller track 82 is attached to the beginning of drives 58 and 60. The stop is then attached to crossbar 84. Roller track 82 is used as a starting ramp for easy accessibility for a fork lift or other material handling device for access to the stored material. Roller wheels 86 are also provided to ease transfer of material from roller track 82 to drives 58 and 60. By providing roller wheels 86, material does not jam or drop into the void created between drives 58 and 60 and roller track 82 when material is being transferred from roller track 82 to drives 58 and 60.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A material storage device, comprising:
   a first drive and at least a second drive, said first drive being able to operate independently of said second drive, each said drive comprising:
   (i) a plurality of pads;
   (ii) a connector for connecting each of said plurality of pads to a remainder of said plurality of pads to maintain a substantially fixed spatial relationship between adjacent pads of said plurality along a path; and
   (iii) a rail, said connector and said plurality of pads being in rolling engagement with said rail such that said plurality of pads are able to move along said path.

2. A material storage device as claimed in claim 1, wherein each of said plurality of pads are detachably connected to said connector, whereby said pads can be detached from said drive.

3. A material storage device as claimed in claim 1, wherein said fixed spacial relationship of said first drive is different than said fixed spacial relationship of said second drive.

4. A material storage device as claimed in claim 1, wherein said path and said rail are nonlinear.

5. A material storage device as claimed in claim 1, wherein each said pad has a supporting surface, said supporting surface being located opposite of a connecting surface, said connecting surface being attached to said connector, said supporting surface having a configuration conducive to supporting a specific type of cargo.

6. A material storage device as claimed in claim 5, wherein said configuration of said plurality of pads of said first drive is different than said configuration of said plurality of pads of said second drive.

7. A material storage device, comprising:
- a first drive and at least a second drive, said first drive being able to operate independently of said second drive, each said drive comprising:
  - (i) a chain;
  - (ii) at least one rotatably mounted rotating disc, said rotating disc in sliding engagement with said chain;
  - (iii) a plurality of pads, each of said plurality of pads being detachably mounted to said chain at a point of connection, each of said plurality of pads having a supporting surface located opposite said point of connection;
  - (iv) at least one rail; and
  - (v) a plurality of rollers, each of said plurality of rollers rotatably attached to said chain and each said pad, said plurality of rollers in rolling engagement with said rail.

8. A material storage device as claimed in claim 7, wherein each said drive further comprises:
- a second chain, said plurality of pads being detachably mounted to said second chain;
- at least a second rotatably mounted rotating disc, said second disc being in sliding engagement with said chain;
- at least a second rail; and
- a second plurality of rollers, each of said second plurality of rollers rotatably attached to said second chain and each said pad, said second plurality of rollers in rolling engagement with said track.

9. A material storage device as claimed in claim 8, wherein said rail is substantially T shaped, said plurality of rollers is positioned on said T shaped rail such that lateral movement of said pads is substantially reduced in a direction parallel to the axis of rotation of said rotating disc.

10. A material storage device as claimed in claim 7, wherein said rail has an angle of inclination such that a load placed on said pad causes said pad to travel in a first direction.

11. A material storage device as claimed in claim 7, wherein each of said plurality of pads of said first drive maintains a fixed spacial relationship with a remainder of said plurality, each of said plurality of pads of said second drive maintains a second fixed spacial relationship with a remainder of said plurality, said fixed spacial relationship being different than said second fixed spacial relationship.

12. A material storage device as claimed in claim 7, wherein each said supporting surface has a unique configuration conducive to supporting a specific type of cargo.

13. A material storage device as claimed in claim 12, wherein said configuration of said plurality of pads of said first drive is different than said configuration of said plurality of pads of said second drive.

14. A material storage device as claimed in claim 7, wherein each of said plurality of pads is detachable from said chain and said roller.

15. A material storage device as claimed in claim 7 wherein at least one of said plurality of rotating discs has a substantially T shaped configuration about a circumference of said rotating disc.

16. A material storage device as claimed in claim 7 further comprising a roller track positioned to said track.

17. A material storage device as claimed in claim 7 further comprising a plurality of roller wheels located between said track and said roller track.

18. A material storage device, comprising:
- a first drive and at least a second drive, each said drive comprising:
  - (i) a chain;
  - (ii) at least one track, said track having a curved configuration,
  - (iii) a plurality of pads, each of said plurality of pads being detachably mounted to said chain at a point of connection, each of said plurality of pads having a supporting surface located opposite said point of connection;
  - (iv) at least one rail; and
  - (v) a plurality of rollers, each of said plurality of rollers rotatably attached to said chain and each said pad, said plurality of rollers in rolling engagement with said rail.

* * * * *